US005554031A

United States Patent [19]

Moir et al.

[11] Patent Number: 5,554,031
[45] Date of Patent: Sep. 10, 1996

[54] TRAINING SYSTEM FOR REPORTING 911 EMERGENCIES

[75] Inventors: Graydon E. Moir, Hagerstown, Md.; Floyd W. Moir, Seymour; Karl Cressotti, Cheshire, both of Conn.

[73] Assignee: Retina Systems, Inc., Seymour, Conn.

[21] Appl. No.: 425,459

[22] Filed: Apr. 20, 1995

[51] Int. Cl.⁶ .................................................. G09B 25/00
[52] U.S. Cl. .......................... 434/111; 434/226; 434/236
[58] Field of Search ........................... 434/111, 236–238, 434/219, 226

[56] References Cited

U.S. PATENT DOCUMENTS

| | | |
|---|---|---|
| 3,878,623 | 4/1975 | Leff . |
| 4,267,646 | 5/1981 | Hagwell . |
| 5,173,052 | 12/1992 | Duncan, Jr. . |
| 5,380,205 | 1/1995 | Bradley et al. . |
| 5,474,484 | 12/1995 | Lemelle ................................ 434/227 X |

Primary Examiner—Richard J. Apley
Assistant Examiner—Glenn E. Richman
Attorney, Agent, or Firm—John H. Crozier

[57] ABSTRACT

In a preferred embodiment, a method of training a child for reporting an emergency on a telephone system of the type having an emergency access code, the method including: providing controllable memory apparatus in which at least one training scenario is recorded; providing a first telephone coupled to the controllable memory apparatus; providing a controller coupled to the controllable memory apparatus to cue selected portions of the recorded training scenario to transmit the same to the earpiece of the first telephone; having a child dial the emergency access code on the first telephone; and cuing successive selected portions of the recorded training scenario to elicit answers from the child, over the first telephone, to questions asked in the selected portions, such answers being of the type required by an emergency dispatcher to at least ascertain the location of the emergency.

8 Claims, 3 Drawing Sheets

TRAINING SYSTEM FOR REPORTING 911 EMERGENCIES

BACKGROUND OF THE INVENTION

1. Field of the Invention

The present invention relates to training systems generally and, more particularly, but not by way of limitation, to a novel system for training children to report emergencies on a "911" system.

2. Background Art

Most communities now have a "911" or similar system in which a person desiring to report an emergency, such as a fire, a heart attack, or a burglary, for example, need only dial a short number, such as "911", to be connected to a central station. While the number and address of the person calling is usually displayed on a computer screen viewable by a dispatcher, so that emergency personnel can be dispatched to the address even if the dialer is unable to speak, the dispatcher will personally answer the call and attempt to ascertain the exact nature of the emergency. The dispatcher must be trained to deal with sometimes excited, incoherent, and/or extremely distraught callers and this situation is exacerbated when the caller is a child.

It is highly desirable that as many children as possible be trained to place emergency calls. The conventional method of such training takes place in a classroom and involves having each child report an example of an emergency to a dummy telephone handset. This method is clearly is inadequate, in that there is no training involving the questions and answers that must flow between a dispatcher and a caller reporting an emergency.

Accordingly, it is a principal object of the present invention to provide a system for teaching skill in reporting emergencies that is particularly applicable to the teaching of children.

It is a further object of the invention to provide such a system that teaches such skills in a realistic manner.

It is an additional object of the invention to provide such a system which is easily transportable between classrooms and schools.

It is another object of the invention to provide such a system that is easily and quickly set up in situations in which training time is limited.

A further object of the invention is to provide such a system that may be semi-automated.

Other objects of the present invention, as well as particular features, elements, and advantages thereof, will be elucidated in, or be apparent from, the following description and the accompanying drawing figures.

SUMMARY OF THE INVENTION

The present invention achieves the above objects, among others, by providing, in a preferred embodiment, a method of training a child for reporting an emergency on a telephone system of the type having an emergency access code, said method comprising: providing controllable memory means in which at least one training scenario is recorded; providing a first telephone coupled to said controllable memory means; providing a controller coupled to said controllable memory means to cue selected portions of said recorded training scenario to transmit the same to the earpiece of said first telephone; having a child dial said emergency access code on said first telephone; and cuing successive said selected portions of said recorded training scenario to elicit answers from said child, over said first telephone, to questions asked in said selected portions, such answers being of the type required by an emergency dispatcher to at least ascertain the location of said emergency.

BRIEF DESCRIPTION OF THE DRAWING

Understanding of the present invention and the various aspects thereof will be facilitated by reference to the accompanying drawing figures, submitted for purposes of illustration only and not intended to define the scope of the invention, on which.

DETAILED DESCRIPTION OF THE PREFERRED EMBODIMENTS

Figure 1:
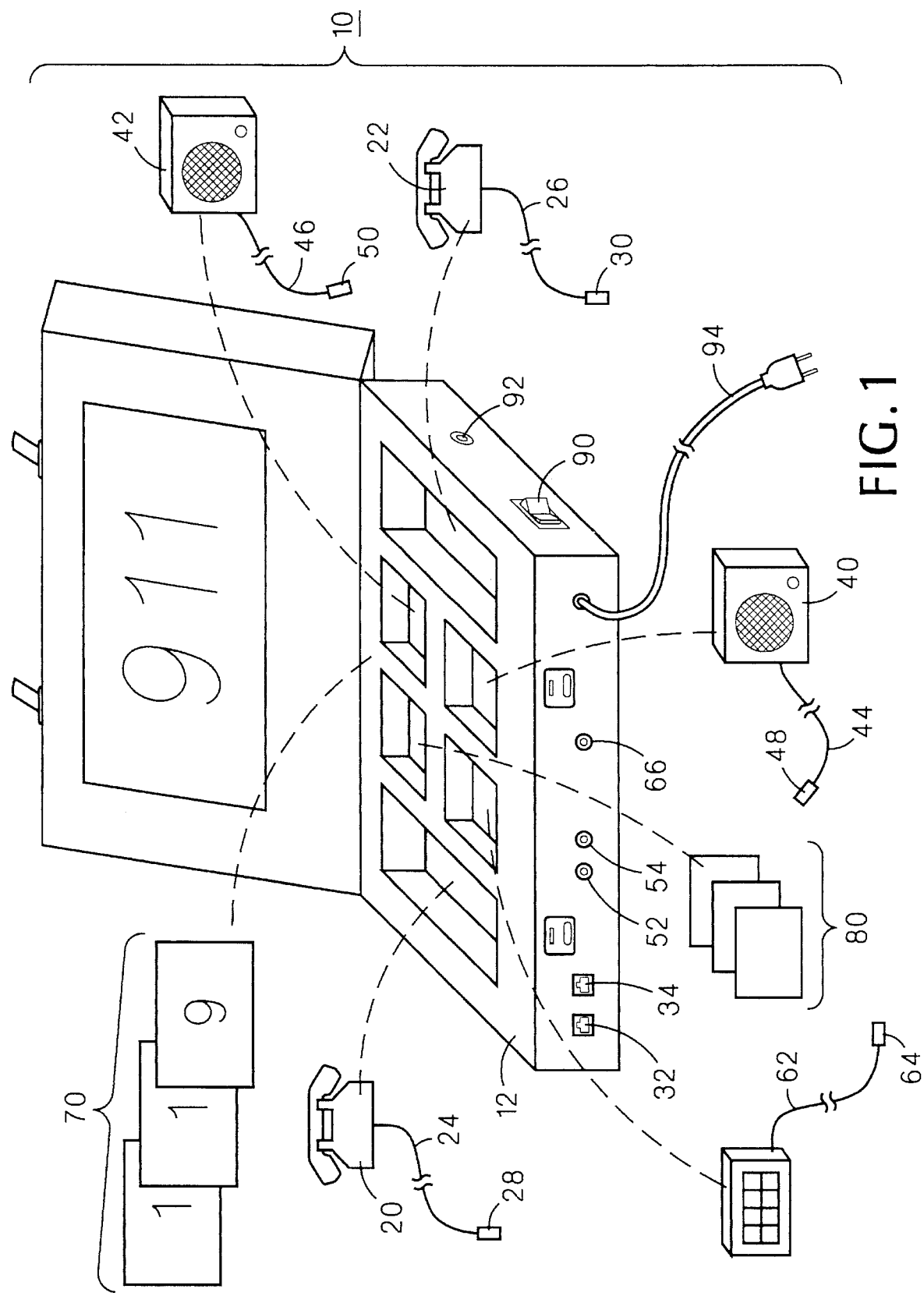
FIG. 1 is an isometric/perspective view of a system according to the present invention in the form of a kit.

Reference should now be made to the drawing figures, on which similar or identical elements are given consistent identifying numerals throughout the various figures thereof, and on which parenthetical references to figure numbers direct the reader to the view(s) on which the element(s) being described is (are) best seen, although the element(s) may be seen also on other views.

FIG. 1 illustrates a system according to the present invention, provided in the form of a kit, generally indicated by the reference numeral 10. Kit 10 includes a carrying case 12 having a liquid crystal display 14 disposed in the lid thereof, the carrying case being configured to contain therein for convenient transportation items of the invention described below:

- two telephone sets 20 and 22 having, respectively, cords 24 and 26 with jacks 28 and 30 for insertion into receptacles 32 and 34 in the carrying case;
- two speakers 40 and 42 having, respectively, cords 44 and 46, with adjustable volume controls, and with jacks 48 and 50 for insertion in receptacles 52 and 54 in the carrying case;
- a button-operated remote control 60 having a cord 62 with a jack 64 for insertion in receptacle 66 in the carrying case;
- three carpet segments 70 (shown in reduced size) having the numerals "9", "1", and "1" thereon; and
- "3 ×5" instruction cards 80.

Carrying case 12 further includes an ON/OFF rocker switch 90, a port 92 for use when inputting pre-recorded emergency scenarios, and a power input cord 94.

Display 14 should be large enough to be clearly seen by all in a large classroom, say, from about 50 feet away. Instruction cards 80 should be clearly written and should be able to quickly convey to an untrained instructor the set-up and operation of system 10.

Figure 2:
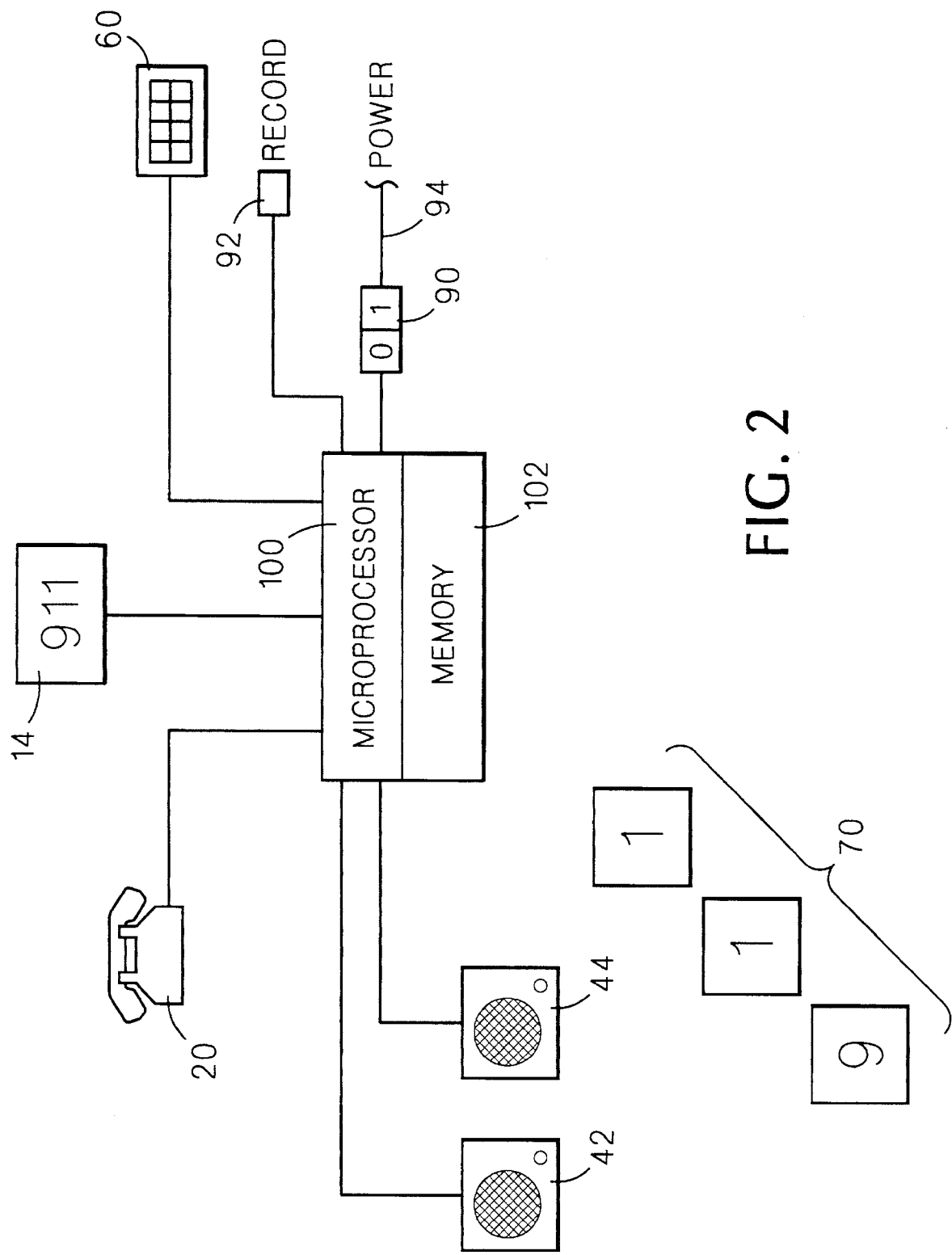
FIG. 2 is a block/schematic diagram showing the system configured for use with younger children.

FIG. 2 illustrates the configuration of system 10 when used for younger children. Here, telephone 20 is positioned for use by each child in turn. Speakers 40 and 42 are positioned so that the child's and the recorded message(s) can be heard by the whole group. Likewise, display 14 is positioned so as to be readily seen by the whole group. Carpet segments 70 are positioned on the floor so that each child will step on them in order when approaching telephone 20. Controller 60 is operated by an instructor (not shown). FIG. 2 also indicates that, interiorly of carrying case 12 (FIG. 1), there is a microprocessor 100, including an associated memory 102, to which microprocessor are connected the elements of system 10 shown on FIG. 2.

In using the arrangement of FIG. 2, carrying case 12 is placed on a suitable surface in front of a group of children, the case is opened, and reference to the first instruction card 80 indicates which elements to be removed from the case and their points of connection to the case. If 110-volt power is to be used, cord 94 is inserted in a suitable receptacle; otherwise, when switch 90 is turned on, an internal, rechargeable, source of battery power (not shown) will be automatically connected to power system 10. Further reference to instruction cards 80 will acquaint the instructor how to operate system 10. The instructor will then use controller 60 to select one of several training scenarios previously entered into memory 102 through port 92. Set-up is now complete and the training scenario might proceed as follows:

1. After a brief explanation to the group of children, guided by an instruction card 80, the instructor invites one of the children to come to telephone 20 to dial "911" and tell the person who answers that the child needs help.
2. As the child walks to telephone 20, the child steps on the numbers "9", "1", and "1" previously placed on the floor, while the class repeats those numbers.
3. The child picks up the handset of telephone 20 and hears a dial tone which is heard by the rest of the children of through speakers 40 and 42.
4. As the child dials "911", the numbers light up on display 14 for all children to hear. If the number is dialed correctly, the first segment of the recording begins automatically. If not dialed correctly, the child hangs up and re-dials, with the help of the instructor, if necessary.
5. A voice answers: "(911. What is your emergency?"
6. Child: "I need help." (The instructor then cues the next recording segment and succeeding segments at the proper pace for the child using controller 60. The instructor can also use controller 60 to skip one or more segments, if necessary.)
7. Voice: "What is your name?"
8. Child: [Responds].
9. Voice: "Are you at home now?"
10. Child: [Responds].
11. Voice: "What is your address?"
12. Child: [Responds].
13. Voice: "Stay on the line with me until help arrives. OK?"
14. Child: "OK".
15. Voice: "Good job. You can hang up now."
16. Instructor and other children applaud.

The digits on display 14 remain displayed throughout the above to help keep the attention of the entire group and to reinforce the memorization thereof.

Figure 3:
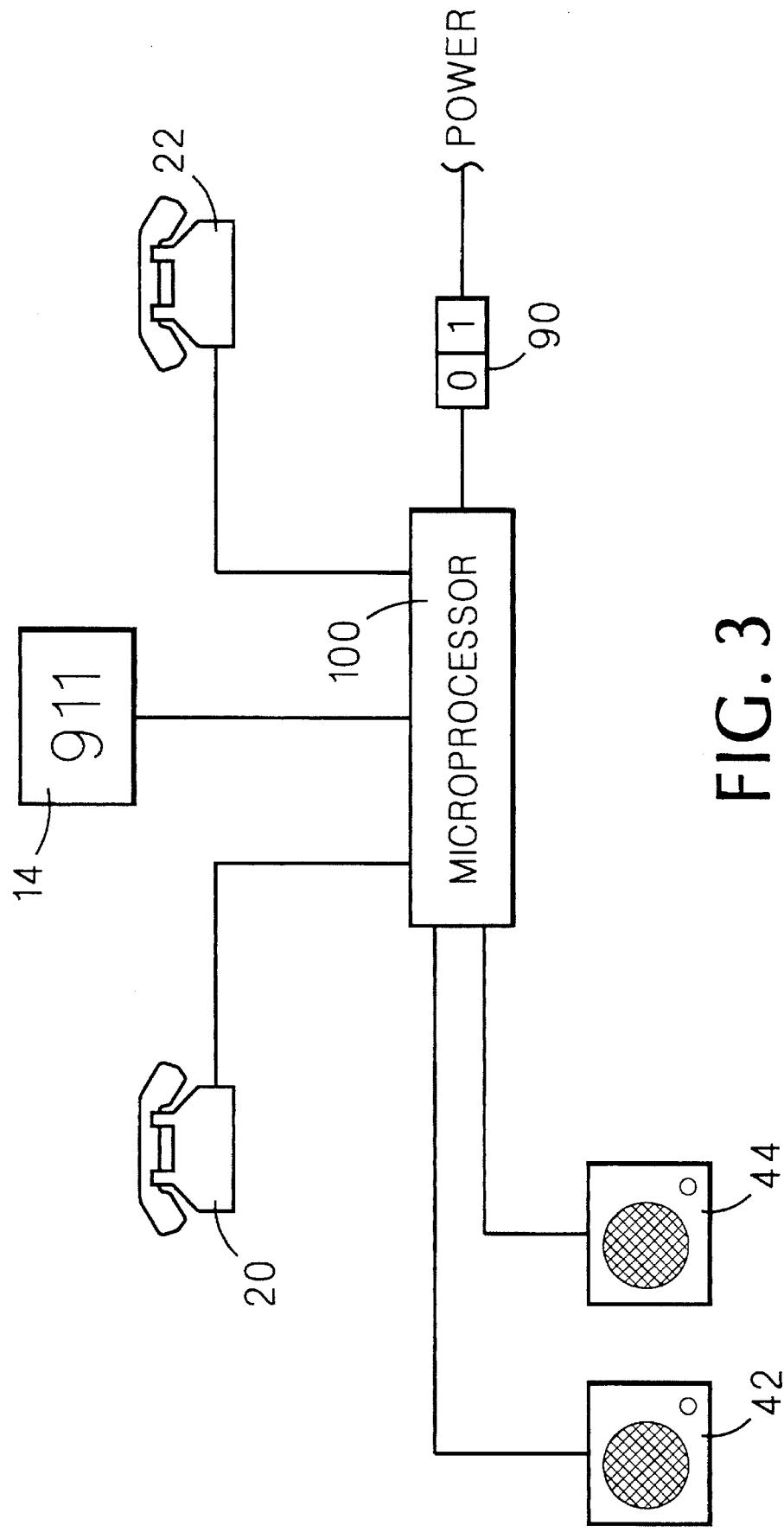
FIG. 3 is a block/schematic diagram showing the system configured for use with older children.

FIG. 3 illustrates the configuration of system 10 when used for older children. The arrangement shown on FIG. 3 is similar to that shown on FIG. 2, except that controller 60 (FIG. 2) has been replaced by telephone 22 and memory 102 and recording port 92 are not required.

With older children, the pre-recorded materials may not be useful and both telephones 20 and 22 may be employed for role playing, with an older child using one telephone and the instructor or a person from a fire/emergency agency using the other telephone. A portion of such role playing prior to arrival of emergency personnel might be as follows: "Is the person breathing? Go check and come back to the phone?" "Is the person lying on the stomach? You must roll the person over onto the back, check for breathing, and come back to the phone."

The elements of system 10 shown as being removable from carrying case 12 (FIG. 1) may also be configured to remain operatively attached to the carrying case to minimize setup time. Memory 102 (FIGS. 2 and 3) may be a tape recorder or it may be a solid state memory. Pre-recorded materials can be loaded to memory 102 through memory port 92 by means of a cassette tape recorder, or via direct microphone input or other non-mechanical method. Controller 60 may be either hand or foot controlled and may have wireless coupling to microprocessor 100 for additional flexibility. Likewise, telephones 20 and 22 and/or speakers 40 and 42 may be wireless.

Another use of system 10, with pre-recording or with role playing, is to teach proper telephone manners and/or to teach young children what to say and not to say to strangers when answering the telephone.

System 10 can be easily and economically constructed using techniques and materials known in the art.

It will thus be seen that the objects set forth above, among those elucidated in, or made apparent from, the preceding description, are efficiently attained and, since certain changes may be made in the above construction without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

I claim:

1. A method of training a child for reporting an emergency on a telephone system of the type having an emergency access code, said method comprising:
   (a) providing controllable memory means in which at least one training scenario is recorded;
   (b) providing a first telephone coupled to said controllable memory means;
   (c) providing a controller coupled to said controllable memory means to cue selected portions of said recorded training scenario to transmit the same to the earpiece of said first telephone;
   (d) having a child dial said emergency access code on said first telephone;
   (e) having instructor cue successive said selected portion of said recorded training scenario to elicit an answer from said child, over said first telephone, to a question asked in said selected portion, such answer being of the type required by an emergency dispatcher; and
   (f) having said instructor repeat step (e) at least one more time to elicit another answer from said child to a different question.

2. A method, as defined in claim 1, further comprising: providing display means to display said code as said code is dialed.

3. A method, as defined in claim 1, further comprising: providing means to permit others to hear said selected portions and said answers.

4. A method, as defined in claim 1, further comprising: providing, as an easily transportable kit in a carrying case, all elements required for practicing said method.

5. An apparatus for training a child for reporting an emergency on a telephone system of the type having an emergency access code, said apparatus comprising:

(a) controllable memory means in which at least one training scenario is recorded;

(b) a first telephone coupled to said memory means;

(c) a controller coupled to said memory means to cue selected portions of said recorded training scenario to transmit the same to the earpiece of said first telephone after the dialing of said code by said child on said first telephone; and (d) said controller being adapted to be used by an instructor to cue a successive said selected portion of said recorded training scenario to elicit an answer from said child, over said first telephone, to a question asked in said selected portion, and said controller being adapted to be used by said instructor to cue at least one more selected and different portion of said recording after said answer is received to elicit a different answer from said child.

6. An apparatus, as defined in claim 5, further comprising: display means coupled to said controllable memory means to display said code as said code is dialed.

7. An apparatus, as defined in claim 5, further comprising: means coupled to said controllable memory means to permit others to hear said selected portions and said answers.

8. An apparatus, as defined in claim 5, wherein: all elements of said apparatus are provided as an easily transportable kit in a carrying case.

* * * * *